United States Patent [19]

Schoenberg

[11] Patent Number: 4,923,707

[45] Date of Patent: May 8, 1990

[54] LOW OIL MAYONNAISE AND METHOD OF MAKING

[75] Inventor: Edgar A. Schoenberg, Germantown, Wis.

[73] Assignee: Kraft, Inc., Glenview, Ill.

[21] Appl. No.: 294,417

[22] Filed: Jan. 6, 1989

[51] Int. Cl.$^5$ .......................... A23D 5/00; A23L 1/09
[52] U.S. Cl. .................................. 426/602; 426/578; 426/605; 426/613
[58] Field of Search ................ 426/605, 602, 613, 578

[56] References Cited

U.S. PATENT DOCUMENTS

| | | | |
|---|---|---|---|
| 4,175,142 | 11/1979 | Hahn et al. | 426/605 |
| 4,352,832 | 10/1982 | Wood et al. | 426/650 |
| 4,578,278 | 3/1986 | Giddey et al. | 426/605 |

OTHER PUBLICATIONS

Lees et al, 1973, Sugar Confectionery and Chocolate Manufacture, Leonard Hill, p. 34.

*Primary Examiner*—Donald E. Czaja
*Assistant Examiner*—Helen Pratt
*Attorney, Agent, or Firm*—Fitch, Even, Tabin & Flannery

[57] ABSTRACT

In accordance with the invention, a low oil mayonnaise composition is provided. The mayonnaise composition contains an edible oil in an amount of from about 65% to about 72%. The mayonnaise composition further includes low D.E. corn syrup at a level of from about 4% to about 15%. Egg yolk is used as an emulsifier at a level of from about 4% to about 8%. Water is present at a level of from about 5% to about 15%. An edible acid is used at a level sufficient to provide from about 0.3% to about 0.5% equivalent glacial acetic acid based on the weight of the moisture present in the mayonnaise. In a method for manufacture of the mayonnaise of the invention, a low D.E. corn syrup is provided. Any water required for the mayonnaise composition is added to the corn syrup and the egg yolk required is also added to the corn syrup to provide a premix. The premix is combined with an edible oil and an edible acid to provide a mayonnaise mix. The oil is present in the mayonnaise mix at a level from about 65% to about 72%. The mayonnaise mix is then processed under conditions of high shear to provide a stable, high viscosity low oil mayonnaise.

8 Claims, No Drawings

LOW OIL MAYONNAISE AND METHOD OF MAKING

FIELD OF THE INVENTION

The present invention relates generally to a method for the manufacture of mayonnaise having an oil content in the lower end of the permissible range and to the product produced by the method. More particularly, the invention is directed to a mayonnaise composition and to a method for manufacture of the composition wherein a low D.E. corn syrup is used to stabilize the mayonnaise emulsion during the manufacture thereof.

1. Background of the Invention

Mayonnaise is the emulsified semi-solid, non-pourable food dressing prepared from vegetable oil, water, egg yolk-containing material and acidifying ingredient. The manufacture of mayonnaise in the United States is controlled by the Food and Drug Administration (FDA)Standards of Identity and a mayonnaise product cannot have less than 65% vegetable oil by weight. The FDA Standards of Identity also prohibit the use of emulsifying agents, such as cooked starch paste prepared from a food starch and hydrocolloids, such as gum acacia, carob bean gum, guar gum, karaya, gum tragacanth, carrageenan, pectin and sodium carboxymethyl cellulose. That is, to be called a mayonnaise product in accordance with the FDA Standards of Identity, the emulsified dressing must be emulsified with egg yolk as the sole emulsifier and must contain at least 65% edible vegetable oil by weight. Countries other than the United States have similar standards.

In one method for the production of mayonnaise, the usual required ingredients are assembled and premixed in a container commonly referred to as a premixer. The resulting premix of the required ingredients is transferred from the premixer in a flowing stream to an emulsifying apparatus, such as a colloid mill or the like. The premix is subjected to high shear forces, finely subdividing the premix and causing an oil-in-water emulsion to form and the emulsion becomes highly viscous. High viscosity is a desired quality for mayonnaise because it produces a high level of stability. The emulsion is then transferred to a suitable container for storage.

In typical mayonnaise emulsions, the high viscosity is a result of tightly packing the globules of the dispersed phase, i.e., the oil globules, in the continuous water phase. This is relatively easy to accomplish when the percentage of oil is greater than 74%. This is why most commercial mayonnaise products typically have oil contents much higher than the legal minimum of 65%, i.e., an oil level of greater than about 74%.

It would be desirable to provide mayonnaise having an oil level in the lower part of the permissible range, i.e., an oil level of from about 65 to about 72%. Such lower oil levels are desirable to limit the caloric level and the amount of fat contained in the mayonnaise. Such limitations have become increasingly important with the current dietary considerations of the public.

2. Prior Art

U.S. Pat. No. 2,944,906 to Spitzer is directed to mayonnaise-like products with normal mayonnaise characteristics, but which contain a lower level of edible oils than are normally used in the manufacture of mayonnaise. In accordance with the Spitzer patent, low oil levels of from about 5 to about 30% by weight are provided in an emulsified dressing by use of a combination of gums. However, as indicated above, such emulsified dressing cannot be called mayonnaise under the FDA and other Standards of Identity. An emulsified oil dressing prepared in accordance with the teachings of the Spitzer patent would be considered to be a reduced oil "salad dressing". The term "salad dressing" refers to salad dressing as defined by the U.S. Food and Drug Administration Standards of Identity. Salad dressing, as thus defined, is the emulsified food product prepared from an edible vegetable oil, an acidifying ingredient selected from vinegar, lemon juice or lime juice, an egg-yolk containing ingredient and a partially or fully cooked starch paste prepared from a food starch. Salad dressings may also contain optional emulsifying ingredients in addition to egg yolk and cooked starch paste. Such additional emulsifying ingredients which are recognized by the FDA Standards of Identity, include gum acacia, carob bean gum, guar gum, gum karaya, gum tragacanth, carrageenan, pectin, propylene glycol ester of alginic acid, sodium carboxymethyl cellulose or any mixture of two or more of such hydrocolloid emulsifying ingredients. A salad dressing, as defined by the FDA Standards of Identity, contains not less than 30% by weight of vegetable oil and not less egg-yolk containing ingredients than is equivalent to egg yolk solids provided by liquid egg yolk at a level of 4% by weight.

U.S. Pat. No. 3,955,010 to Chozianin, et al. describes an improved emulsified oil dressing having a low level of acid and low pH, but which has improved storage qualities. The Chozianin, et al. patent is particularly directed to providing low levels of acid and a bland flavor in salad dressing and french dressing type products. The emulsified oil dressings particularly described in the Chozianin, et al. patent have an edible oil in the amount of between 1% and 50%. As indicated, such emulsified oil dressings cannot be considered to be mayonnaise in accordance with the FDA and other Standards of Identity.

Accordingly, it is an object of the present invention to provide novel mayonnaise food products having the viscosity characteristics associated with use of high levels of oil within the range permissible by the FDA and other Standards of Identity, but which have low levels of oils within the permissible range.

A further object of the present invention is to provide novel mayonnaise food products having a low level of oil within the permissible range which are stabilized with low D.E. corn syrup.

SUMMARY OF THE INVENTION

In accordance with the invention, a low oil mayonnaise composition is provided. The mayonnaise composition contains an edible oil in an amount of from about 65% to about 72%. The mayonnaise composition further includes low D.E. corn syrup at a level of from about 4% to about 15%. Egg yolk is used as an emulsifier at a level of from about 4% to about 8%. Water is present at a level of from about 5% to about 15%. An edible acid is used at a level sufficient to provide from about 0.3% to about 0.5% equivalent glacial acetic acid based on the weight of the moisture present in the mayonnaise.

In a method for manufacture of the mayonnaise of the invention, a low D.E. corn syrup is provided. Any water required for the mayonnaise composition is added to the corn syrup and the egg yolk required is also added to the corn syrup to provide a premix. The premix is combined with an edible oil and an edible acid to provide a mayonnaise mix. The oil is present in the mayonnaise mix at a level from about 65% to about 72%. The mayonnaise mix is then processed under conditions of high shear to provide a stable, high viscosity low oil mayonnaise.

DETAILED DESCRIPTION OF THE INVENTION

In typical mayonnaise emulsions, the high viscosity is a result of tightly packing the oil globules in the oil-in-water emulsion which results from subjecting a mayonnaise mix to high shear. Such tight packing of oil globules readily occurs when the percentage of oil is greater than 74%. This is the reason that commercial mayonnaise typically have oil levels much higher than the legal minimum of 65% and more often have oil levels of greater than 74%.

A major factor which affects the viscosity of emulsions is the viscosity of the continuous phase of the emulsion. In accordance with the present invention, low D.E. corn syrup is incorporated into the continuous water phase of the mayonnaise. Low D.E. corn syrup has a very high viscosity and also has a low sweetness level and can be used in the continuous water phase at relatively high concentrations. The use of low D.E. corn syrup increases the viscosity of the continuous water phase and of the finished emulsion even with the use of low levels of edible oil of from about 65% to about 72%.

Corn syrup is produced from a suspension containing 35-40% of starch in water which is fed to an autoclave. Enough hydrochloric acid is added to provide a concentration of about 0.02 N HCl. The autoclave is heated by the introduction of steam until a temperature of about 150° C. is reached. The mixture is held at this temperature for a period of time sufficient to produce the required degree of hydrolysis. This is specified analytically by the percentage of reducing sugar in the dry solids of the hydrolyzate and ranges from about 25% to about 60% depending upon the type of product desired. The contents of the autoclave are then neutralized to pH 4-5 by the addition of soda ash. The neutralized hydrolyzate is further refined by filtration and treatment with activated carbon and is then evaporated to provide a heavy syrup. The final syrup contains about 75-80% dry solids. Corn syrup may also be dried to form corn syrup solids with moisture contents of approximately 5%.

Corn syrup is specified on the basis of reducing sugar content on a dry basis. This is designated as dextrose equivalent or (D.E.) when calculated as dextrose. Corn syrup is marketed with various concentrations of solids usually determined by density determination and designated in degrees Baume' (Be'). Typically, corn starch syrups are marketed at densities of 41-45. Be'.

In accordance with the present invention, low D.E. corn syrups or corn syrup solids are used. By low D.E. corn syrup is meant those corn syrups having a D.E. of from about 27 to about 43 D.E. Such low D.E. corn syrups have a very high viscosity and relatively low sweetness. The relatively low sweetness is the result of having low levels of reducing sugars, such as dextrose and maltose, and relatively high levels of non-reducing sugars such as trisaccharides and higher saccharides. The low D.E. corn syrup is preferably used at a level of from about 4% to about 15% by weight of the finished mayonnaise product, most preferably at a level of from about 5% to about 10%.

A typical analysis for a low D.E. corn syrup useful in the present invention is as follows:

| | |
|---|---|
| Moisture | 22.3 |
| Solids, % | 77.7 |
| Dextrose Equivalent | 27.5 |
| $SO_2$ | 10 ppm |
| pH (1:1)'5.0 | |
| Baume' at 100° F. | 42.2 |
| Weight per gallon at 100° F. | 11.7# |
| Carbohydrate Composition (Approx. %, dry basis) | |
| Monosaccharides (Dextrose) | 8.5 |
| Disaccharides (Maltose) | 8.0 |
| Trisaccharides | 7.5 |
| Tetrasaccharides and Higher | 76.0 |
| Viscosity (Poises) | |
| 80° F. | 700 |
| 100° F. | 190 |
| 120° F. | 72 |
| 140° F. | 30 |

The edible oil used in mayonnaise can be any edible vegetable oil and is preferably a salad oil. Corn oil, sunflower oil, soybean oil and cottonseed oils are preferred. Lightly hydrogenated soybean oil and cottonseed are particularly preferred. The oil can be winterized and a crystal inhibitor such as oxystearin can be included. The edible oil is present in the mayonnaise at a level of from at least 65% to about 72%. As indicated, to be sold as mayonnaise in accordance with the FDA and other Standards of Identity, the oil level cannot be below 65%.

The egg yolk component in the mayonnaise of the invention can be in any of the usual forms of egg yolk, such as liquid egg yolks, frozen egg yolks, rehydrated dried egg yolk, liquid whole eggs, frozen whole eggs, rehydrated dried whole eggs or any of the foregoing combined with liquid egg whites or frozen egg whites. The egg yolk-containing ingredient is added to the mayonnaise in a quantity sufficient to provide from about 4% to about 8% egg yolk in the mayonnaise. It is preferred that the amount of egg yolk be from about 4% to about 6% of the mayonnaise. The acid ingredient can be any edible acid. Suitable edible acids include acetic acid, citric acid, or a mixture of these acids. Acetic acid, in the form of vinegar, or citric acid, in the form of lemon or lime juice, are usually the preferred edible acids which are used in mayonnaise. All percentages used herein are by weight of the finished mayonnaise product, unless otherwise specified. The acid source, such as vinegar, is used in an amount sufficient to provide from about 0.3% to about 0.5% equivalent glacial acetic acid based on the weight of the moisture present in mayonnaise.

Additional ingredients which can be included in mayonnaise in accordance with the FDA Standards of Identity include salt (preferably from about 0.5% to about 3%), sugar (preferably from about 1% to about 4%), mustard (preferably from about 0.1% to about 2 percent, and additional spices, flavorings or preservatives, such as paprika, monosodium glutamate, and ethylenediamine-tetra acetic acid.

As indicated above, it is known to add sugar to mayonnaise in accordance with the FDA Standards of Identity. The sugar can be selected from sucrose, dextrose, corn syrup, invert syrup, maltose, or honey. While it is known to use dextrose and corn syrup in the manufacture of mayonnaise, it has not been previously known to use a low D.E. corn syrup or corn syrup solids to provide stability when the level of oil is reduced to the lower part of the permissible range of oil, i.e, from at least 65% to about 72% edible oil in the mayonnaise composition.

When dried corn syrup solids are used, they can be mixed with the water and other liquid components at ambient temperatures, i.e. from about 60° F. to about 80° F. In preparing the mayonnaise product of the invention from low D.E. corn syrup, the corn syrup is preferably first heated to a temperature sufficiently high to reduce the viscosity of the corn syrup to a workable level. In general, a suitable temperature is from about 110° F. to about 140° F., preferably from about 100° F. to about 130° F. Any spices or flavorings are then combined with the water and added to the corn syrup. If low D.E. corn syrup solids are used, the amount of water used is adjusted to maintain the same finished product moisture. The egg yolk is also added to the corn syrup under agitating conditions to provide a premix. After a thorough dispersion of the added ingredients has been obtained, the oil and vinegar are added to the premix under agitating conditions to provide a mayonnaise mix. The mayonnaise is then processed under conditions of high shear using suitable apparatus, such as a colloid mill, to provide an oil-in-water mayonnaise emulsion having a viscosity equivalent to that of a mayonnaise product with higher levels of oil.

The following examples further illustrate various features of the invention, but are intended to in no way limit the scope of the invention which is defined in the appended claims.

EXAMPLE

A mayonnaise product having the following formulation by weight was produced in accordance with the method of the invention.

| Ingredient | Weight Percent |
| --- | --- |
| Soybean oil | 70.70 |
| Egg yolk (salted, pasteurized) 43% solids | 6.00 |
| Vinegar (distilled) usage level adjusted to provide an appropriate level of acetic acid based on the moisture level | variable |
| Corn syrup - 83% solids, 43 D.E. | 5.79 |
| Finely divided whole mustard seed | 1.00 |
| Salt (sodium chloride) | 0.47 |
| E.D.T.A. | 75 ppm |
| Water | 8.5 to 100 |

A mayonnaise product having the above formulation was produced in accordance with the following method: The corn syrup was heated to a temperature of 130° F. The ground mustard seed, salt and E.D.T.A. were combined with the water and the water and egg yolk were added to the heated corn syrup under agitating conditions to provide a premix. After a thorough dispersion of the added ingredients had been obtained, the oil and vinegar were added under agitating conditions to provide a mayonnaise mix. The mayonnaise mix was then processed under conditions of high shear using a colloid mill to provide an emulsified mayonnaise having a viscosity equivalent to that of mayonnaise produced using higher levels of edible oil, i e., above 74%, but which had 70% of edible oil by weight of the mayonnaise.

What is claimed is:

1. A method for manufacture of mayonnaise comprising providing low D.E. corn syrup having a D.E. of from about 27 to about 43, adding water and egg yolk to said corn syrup to provide a premix, combining said premix with oil and an edible acid to provide a mayonnaise mix, said oil being present at a level of from at least 65% to about 72% in said mayonnaise mix and processing said mayonnaise mix under conditions of high shear to provide a stable, high viscosity, low oil mayonnaise.

2. A method in accordance with claim 1 or 2 wherein said corn syrup is present in said mayonnaise mix at a level of from about 4% to about 15%.

3. A method in accordance with claim 1 wherein said corn syrup is heated to a temperature of from about 100° F. to about 140° F.

4. A method in accordance with claim 1 wherein said egg yolk is present in said mayonnaise mix at a level of from about 4% to about 8%.

5. A method in accordance with claim 1 wherein said edible acid is present at a level sufficient to provide from about 0.3 to about 0.5 percent equivalent glacial acetic acids by weight based on the weight of moisture present in said mayonnaise mix.

6. An improved low oil mayonnaise composition comprising an edible oil in an amount of from at least 65% to about 72% and low D.E. corn syrup having a D.E. of from about 27 to about 43 at a level of from about 4% to about 15%.

7. A mayonnaise composition in accordance with claim 6 which also includes egg yolk at a level of from about 4% to about 8%.

8. A mayonnaise composition in accordance with claim 7 which also includes an edible acid at a level sufficient to provide from about 0.3 to about 0.5 percent equivalent glacial acetic acid by weight based on the weight of the moisture present in said mayonnaise composition.

* * * * *